April 10, 1962    H. T. H. CARLSSON    3,029,378
ELECTRIC GENERATORS OF THE FLYWHEEL TYPE
Filed April 25, 1960
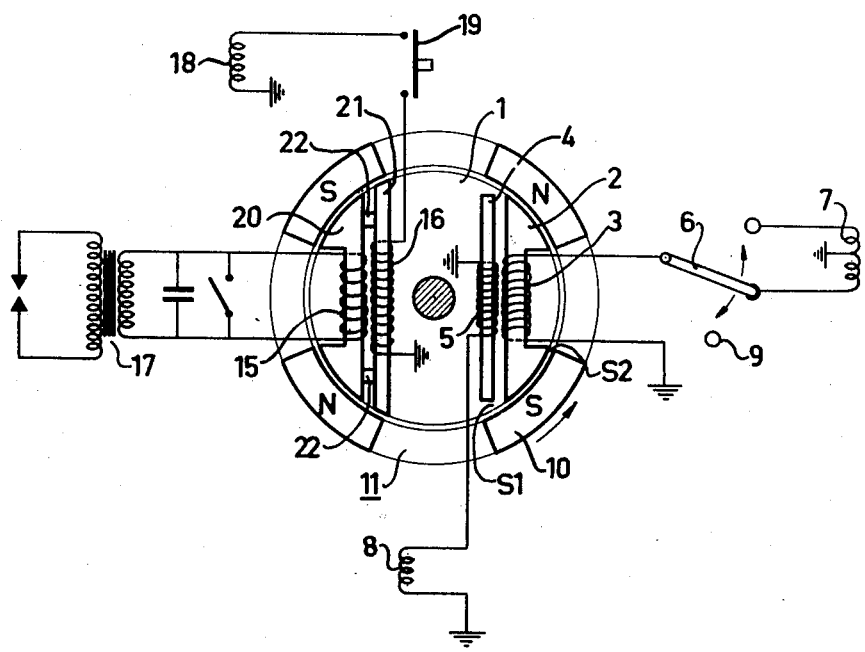

United States Patent Office 3,029,378
Patented Apr. 10, 1962

3,029,378
ELECTRIC GENERATORS OF THE FLYWHEEL TYPE
Hans Thorsten Henrik Carlsson, Halmstad, Sweden, assignor to Haldex Aktiebolag, Knaredsgatan, Halmstad, Sweden, a corporation of Sweden
Filed Apr. 25, 1960, Ser. No. 24,300
Claims priority, application Sweden Apr. 28, 1959
3 Claims. (Cl. 322—90)

Electric generators of the type generally called flywheel magnets and adapted for use in motor-driven vehicles, are usually provided not only with an ignition coil for the generation of ignition voltage, but also with means for the generation of illuminating current. Thus, for instance, in flywheel magnets for light motorcycles it is common practice to use a single coil for generating the illuminating current both for the road-light and for the rear light or warning light, the two light circuits being connected in parallel. This system has certain drawbacks involving practical difficulties. A flywheel magnet has restricted power-yielding facilities, for which reason the induced voltage becomes rather load-dependent. There is a difference in power between a road-light and a warning light, which is quite considerable in practice. Another fact of practical importance is that a light for low power (the warning light) cannot be constructed so as to endure the same over-voltage as does a light for higher power. As a consequence with two lights connected in parallel and having different characteristics relative to life and endurance, there is always the risk that one of the lamps breaks down far earlier than the other.

Special risks are encountered in the change-over switch for connecting the road-light. Should a bad contact occur in such a way that the road-light does not receive current, the warning light will have to receive a considerable surplus voltage, which almost necessarily leads to a break down. If the road-light is then called upon to carry the whole power from the illuminating coil, a certain overload is met with, whereby the life length of the lamps is shortened.

In later years, certain proposals have been made to eliminate these very considerable practical disadvantages. The solutions have been aimed at suitable electrical circuit arrangements for reducing the mutual influence of the light circuits. The present invention refers to an arrangement in which said drawbacks are practically eliminated and which, in addition thereto, has other technical advantages.

The invention relates to such alternating current generators of the flywheel type for the generation of current for the ignition and illuminating circuits in motor-driven vehicles, the stators of which are provided with a number of magnetic bridges each being adapted to bridge a pair of poles of the rotor and each consisting of two coil-carrying magnetic cores. The distinguishing feature of the invention resides in that the two coils are arranged as voltage sources in separate circuits for the road-light and the warning light, respectively, the circuits being magnetically coupled to each other through the cores in such a manner that, when the road light circuit is switched in, a full operating voltage will be induced in the circuit for the warning light by reason of the consequent changes in the distribution of the magnetic flux between the two cores.

In an arrangement according to the invention also brake light current may be supplied. For that purpose the magnetic circuit intended for the ignition is provided with two coil-carrying magnetic cores, the coils of which constitute voltage sources for the ignition circuit and for the brake light circuit, respectively.

The invention will be explained more closely with reference to the accompanying drawing, which illustrates schematically a section through an embodiment of the generator.

The armature plate is designated by 1. Arranged on the same is a core 2 with a coil 3. A further smaller core 4 is arranged beside the core 2, said core 4 having a coil 5 wound thereon. These two cores form a magnetic bridge having the magnetic flux flowing therethrough both at the same time. One end of the coil 3 is connected to ground and the other end thereof is connected through a change-over switch 6 to a search-light 7 for the illumination of the road. The change-over switch 6 distributes the current to full light or dimlight for the search-light 7, which, as will appear from the drawing, consists of two lights or of one light with two incandescent filaments. The current consumption in connection with full light and dim light is taken to be the same. One end of the coil 5 is connected to earth and the other end thereof is connected to a warning light 8, which is generally arranged at the rear of the vehicle. The latter circuit has no switch connected into the same, this light receiving full operating voltage in a manner to be described in the following. As will appear from the drawing, the core 2 has a considerably larger cross sectional area than that of the core 4. The latter is adapted in size and shape and arranged so as to have a weaker magnetic coupling to the pole shoes 10 of the rotating flywheel 11. This weaker coupling is provided, inter alia, by the fact that there is an air gap S1 between the pole shoes and said core, which gap is larger than the corresponding air gap S2 between the core 2 and the pole shoes 10.

When driving in day time, the contact arm of the change-over switch 6 is set to the zero-position, which is designated by 9. The circuit will thus be entirely unloaded, and no current flows through the coil 3. The magnetic resistance of the core 2 will then be practically zero. This ensures that practically no magnetic flux passes through the core 4, when the coil 3 is unloaded. Practically the whole magnetic flux from the pole shoes follows the path of least resistance and passes through the core 2, which thus shunts the core 4. Thus, when the change-over switch 6 is set to off, that is to say, when the search-light is put out, practically no current will be induced in the coil 5. If the coil 3 is now loaded by the search-light 7 being switched on through the change-over switch 6, the flux distribution will at once be altered because the core 2 then has a greater magnetic resistance, so that a more substantial portion of the flux will pass through the core 4. Thereby current will immediately be induced in the coil 5 and the light 8 receives current and lights up. Both the search-light and the warning light will thus be lit and put out by the same change-over switch, in spite of the fact that the circuit for the rear light is not electrically connected in the circuit of the search-light, in which the change-over switch is connected.

Through the invention it will thus be possible to control an electric circuit having a comparatively low power output by another electric circuit having a comparatively high power output, in the manner described. It is obvious that a certain mutual relation must exist between the respective power outputs, in order that the control shall be sufficiently comprehensive. Obviously, it will not be possible entirely to prevent a current through the coil 5, when the coil 3 is currentless. A small flux through the core 4 will occur unavoidably. However, the current in coil 5 produced by this flux is very inconsiderable, and with proper adjustment it will not be sufficient to light the light 8. As a practically valid relation between the power outputs one third for the warning light and two thirds for the search-light may be mentioned. As a consequence, the previous drawbacks relative to the risk of a break down of the warning light, in case the search-light should be put out, are entirely eliminated through the invention.

Otherwise, the flywheel magnet proper may be constructed according to a conventional pattern, that is to say, it may be provided with an interior ignition coil having a primary winding and a secondary winding. There are cases, however, when it is desirable in a motorcycle or the like to provide a brake light. In previous constructions of flywheel magnets, this condition has been difficult to fulfil. The requisite power for the brake light shall, namely, always be at hand, and shall be of sufficient magnitude and, preferably, when switched in, it should not influence either the illuminating system nor the ignition system to any appreciable extent.

The invention provides for facilities to answer these requirements in the manner illustrated in the drawing. Opposite to the coils 3, 5 there are provided two coils 15 and 16, one of said coils being the feeding coil for ignition coil 17 located outside the flywheel magnet, and the other of said coils being arranged for the braking light 18, into the circuit of which the braking contact 19 is also connected. The two coils 15 and 16 are wound on core coils 20 and 21, respectively. These two cores are magnetically coupled to one another through magnetic intermediate pieces 22 and to the pole shoes of the flywheel and form together a magnetic bridge.

In this case it is not desirable that one of the circuits shall actively control the other. The magnetic coupling is therefore made considerably stronger than in the case previously described. As a matter of fact, it is a requirement in this case to distribute an available magnetic flux in a suitable manner. The principal portion of this flux will under all circumstances have to pass through the core 20, in order that a maximum current and, consequently, a sufficient ignition power shall be obtained. The core 21 will have to take so much of the flux that a sufficiently high illuminating power is attained for the braking light 18.

To elucidate the notion of magnetic coupling, that is to say, the distribution of the flux provided by two iron cores located adjacent to one another, the following should be noted. A strong magnetic coupling exists between the cores 20 and 21, in as much as they are mutually connected by means of intermediary members of a magnetic material. On the other hand, the magnetic coupling is weaker between the cores 2 and 4. Inter-connecting magnetic members are lacking between the cores 2 and 4, and the distribution of the flux substantially takes place over the pole shoes. Both forms of embodiment obviously fall within the scope of the magnetic coupling, the strength of which is substantially determined by the facilities for the flux to pass over from one core to the other over ferro-magnetic inter-connecting members and suitable sized air gaps between the cores and the pole shoes.

In the first case above described, a weaker magnetic coupling will have the effect that the coil 3 operates more independently and less dependent on the coil 5. A weaker magnetic coupling also imparts to the coil 5 a greater independency, which however, quite naturally has the effect that the influence from the main coil 3 becomes weaker. As a consequence the warning light will operate with a certain and quite noticeable voltage, when the main coil is disconnected (with the search-light put out). A stronger magnetic coupling on the other hand, imparts the opposite condition. The problem in the practical application, therefore, is a matter of adapting the degree of magnetic coupling to the actual requirements in each case.

Also in the second combination of cores and coils it is required that the coil 15 should be loaded in order that the coil 16 shall obtain sufficient current. This condition exists, however, in as much as the motor and thus the flywheel magnet cannot rotate, unless an igniting system operates.

On the other hand, the cutting in and out of the coil 16 shall not influence the function of the coil 15 in any noticeable degree. The proportion between the two power outputs should, as has been found in practice, be approximately 40% for the brake light and 60% for the generator coil, the value for the brake light being regarded as a maximum.

What is claimed is:

1. An improved electric generator, having a rotor mounted for rotation and carrying at least a north magnetic pole and a south magnetic pole as sources of magnetic flux for generating electric power for at least two separate circuits requiring respectively different operating power inputs with neither of said power inputs being increasable by the opening of one of said circuits, said improved generator comprising; a stator having at least a pair of magnetic material cores mounted approximately parallel, adjacent to each other, and between said rotor magnetic poles as a magnetic bridge for providing parallel paths for the flow of said magnetic flux between said magnetic poles, one said core being relatively larger than the other said core and both cores being separated from said poles by air spaces; coils wound respectively on said cores, said coils cooperating with said rotating poles when both said coils are respectively connected to said respective circuits to provide electrical power in each said circuit, said respective powers varying directly with the relative sizes of the cores, the number of turns in the coils, and inversely with the size of the air spaces between the cores and the poles, and when one coil is connected to its associated circuit and the other coil is open, the core of said other coil presents a relatively lower magnetic resistance than when both said coils are connected to their respective circuits to thereby reduce the magnetic flux flow in the core of the connected coil and therefore the power provided to said connected circuit, and means for controlling the generation of power by said generator.

2. An improved electric generator as described in claim 1 characterized in that means for controlling the generation of power for both said circuits comprises a changeover switch connected in the circuit of the coil having the relatively larger core, said switch when open breaking said circuit and unloading said coil to practically eliminate the magnetic resistance of said larger core and make it the practically exclusive path for the flow of flux between said poles whereby almost no flux flows in said relatively smaller core and therefore no operating power is generated in either of the coils and respectively connected circuits.

3. An improved electric generator as described in claim 1 characterized in that means for controlling the generation of power for both said circuits comprises; switches respectively connected in said separate circuits for individually opening and closing said circuits, magnetic materials intermediate pieces connecting said cores to provide a selected value of magnetic coupling therebetween, whereby sufficient magnetic flux flows in said coupled cores to generate operating power in both said coils and closed circuits and somewhat reduced operating power in a coil connected to its closed circuit when said other circuit is open.

No references cited.